(12) United States Patent
Raffle et al.

(10) Patent No.: US 9,171,198 B1
(45) Date of Patent: Oct. 27, 2015

(54) IMAGE CAPTURE TECHNIQUE

(75) Inventors: Hayes Solos Raffle, Palo Alto, CA (US); Sergey Brin, Palo Alto, CA (US); Bo Wu, Alhambra, CA (US); Michael Patrick Johnson, Sunnyvale, CA (US); David Sparks, Cupertino, CA (US)

(73) Assignee: Google Inc., Mountain View, CA (US)

( * ) Notice: Subject to any disclaimer, the term of this patent is extended or adjusted under 35 U.S.C. 154(b) by 553 days.

(21) Appl. No.: 13/563,238

(22) Filed: Jul. 31, 2012

Related U.S. Application Data

(60) Provisional application No. 61/619,335, filed on Apr. 2, 2012.

(51) Int. Cl.
*H04N 5/232* (2006.01)
*G06K 9/00* (2006.01)

(52) U.S. Cl.
CPC ............ *G06K 9/00281* (2013.01); *H04N 5/232* (2013.01)

(58) Field of Classification Search
None
See application file for complete search history.

(56) References Cited

U.S. PATENT DOCUMENTS

| | | | |
|---|---|---|---|
| 4,081,623 A | 3/1978 | Vogeley | |
| 5,360,971 A | 11/1994 | Kaufman | |
| 5,570,151 A | 10/1996 | Terunuma | |
| 5,926,655 A | 7/1999 | Irie | |
| 7,515,054 B2 | 4/2009 | Torch | |
| 8,073,198 B2 | 12/2011 | Marti | |
| 8,160,311 B1 * | 4/2012 | Schaefer | 382/118 |
| 2005/0007552 A1 * | 1/2005 | Fergason et al. | 351/210 |
| 2007/0086764 A1 | 4/2007 | Konicek | |
| 2007/0201847 A1 | 8/2007 | Lei | |
| 2008/0211768 A1 | 9/2008 | Breen | |

OTHER PUBLICATIONS

Emiliano Miluzzo et al., "EyePhone: Activating Mobile Phones With Your Eyes", MobiHeld 2010 Proceedings of the Second ACM SIGCOMM Workshop on Networking, Systems, and Applications on Mobile Handhelds, Aug. 30, 2010, pp. 15-20, published by Association for Computing Machinery, New York, NY, USA.

* cited by examiner

*Primary Examiner* — Twyler Haskins
*Assistant Examiner* — Angel L Garces-Rivera
(74) *Attorney, Agent, or Firm* — McDonnell Boehnen Hulbert & Berghoff LLP

(57) ABSTRACT

This disclosure relates to winking to capture image data using an image capture device that is associated with a head-mountable device (HMD). An illustrative method includes detecting a wink gesture at an HMD. The method also includes causing an image capture device to capture image data, in response to detecting the wink gesture at the HMD.

33 Claims, 7 Drawing Sheets

IMAGE CAPTURE TECHNIQUE

CROSS-REFERENCE TO RELATED APPLICATIONS

This application claims the benefit of U.S. Provisional Application No. 61/619,335, filed on Apr. 2, 2012, titled "Wink to Take a Photo on an HMD," the entirety of which is incorporated herein by reference.

BACKGROUND

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and less obtrusive.

The trend toward miniaturization of computing hardware, peripherals, sensors, detectors, and image and audio processors, among other technologies, has helped open up a field sometimes referred to as "wearable computing." In the area of image and visual processing and production, it has become possible to consider wearable displays that place a very small image display element close enough to one or both of the wearer's eyes such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called "head-mountable displays". A head-mountable display places a graphic display close to one or both of the wearer's eyes. To generate the images on the display, a computer processing system can be used.

Emerging and anticipated uses of wearable displays include applications in which users interact in real time with an augmented or virtual reality. These applications can be mission-critical or safety-critical in some fields, such as public safety or aviation.

SUMMARY

This disclosure provides, in part, a method. The method includes detecting a wink gesture at a head-mountable device (HMD). The method also includes causing an image capture device to capture image data, in response to detecting the wink gesture at the HMD.

This disclosure also provides, in part, a non-transitory computer-readable medium. The medium has stored therein instructions that, upon execution by a computing device, cause the computing device to perform functions. The functions include detecting a wink gesture at an HMD. The functions also include causing an image capture device to capture image data, in response to detecting the wink gesture at the HMD.

This disclosure also provides, in part, a system of an HMD. The system includes an image capture device that is connected to the HMD. When the HMD is worn, the image capture device is configured to capture image data. The system also includes a wink-detection system that is connected to the HMD. When the HMD is worn, the wink-detection system is configured to detect a wink gesture at the HMD. The system also includes a computer-readable medium. The medium has stored therein program instructions that, upon execution by a computing device, cause the computing device to perform functions. The functions include causing the image capture device to capture the image data, in response to the wink-detection system detecting the wink gesture at the HMD.

DETAILED DESCRIPTION

1. Overview

This disclosure relates to winking to capture image data using a camera, such as a point-of-view camera, that is associated with a head-mountable device (HMD), such as a glasses-style wearable computer. An HMD can include a system, such as a proximity sensing system, that can detect a wink by the HMD's wearer (when the HMD is being worn). Upon detecting a wink, the HMD can responsively operate a camera to capture image data, such as, for example, an image or a frame of a video, among other types of image data. To this end, the HMD can use its own camera (such as a front-facing camera) or can use a separate camera (such as a handheld camera). These and other aspects of this disclosure are discussed in more detail below in sections 2 and 3(*a*)-3(*c*).

Some HMDs can incorporate one or more other gestures into the image-capturing process. As an example, another gesture, such as an initial wink, a blink, a touchscreen gesture, or a head movement, can activate a camera interface of an HMD. Once the camera interface is active, a secondary gesture can trigger and/or operate one or more of the camera's features, such as a flash setting or zoom level. Then, a wink can trigger the camera to capture image data. These and other aspects of this disclosure are discussed in more detail below in sections 3(*d*) and 3(*e*).

Also discussed in this disclosure are various other aspects of winking to capture image data. For instance, in some HMDs, a time, place, particular user of the HMD, or another context in which the HMD operates can activate, de-activate, or modify image-capturing functionality of the HMD. In addition, in some HMDs, a wink gesture can start or end a photographic process, such as a time-lapse photography process. And some HMDs can use captured image data as input to one or more of the HMD's functions, such as image recognition, mapping, and social media, among others. These and other aspects of this disclosure are discussed in more detail below in sections 3(*f*)-3(*h*).

2. Device and System Architecture a. Head-Mountable Devices

Figure 1A:
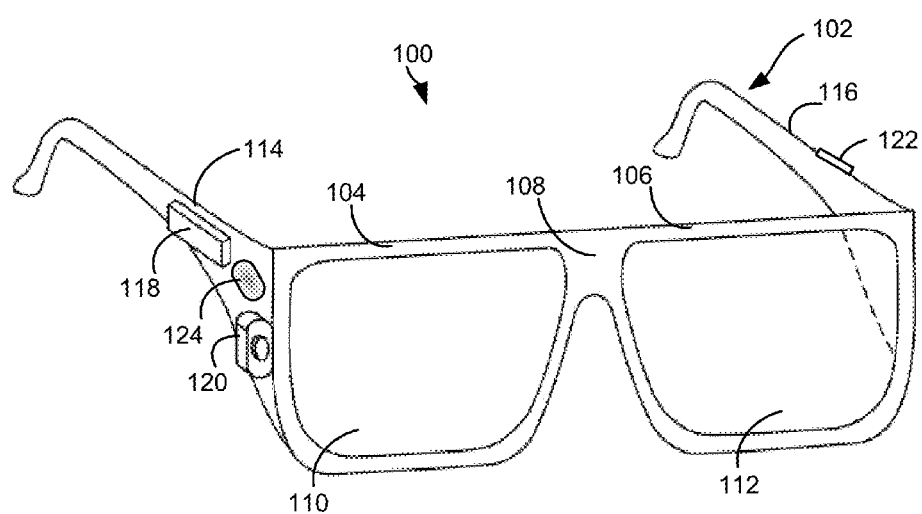
FIGS. 1A and 1B illustrate an example of a wearable computing system.

FIG. 1A illustrates an example of a wearable computing system 100. The wearable computing system 100 includes a wink-detection system 136 and an image-capturing system 120. While FIG. 1A illustrates a head-mountable device (HMD) 102 as an example of a wearable computing system, other types of wearable computing systems could be used. As illustrated in FIG. 1A, the HMD 102 includes frame elements, including lens frames 104, 106 and a center frame support 108, lens elements 110, 112, and extending side arms 114, 116. The center frame support 108 and the extending side arms 114, 116 are configured to secure the HMD 102 to a user's face via a user's nose and ears.

Each of the frame elements 104, 106, and 108 and the extending side arms 114, 116 can be formed of a solid structure of plastic and/or metal, or can be formed of a hollow structure of similar material so as to allow wiring and component interconnects to be internally routed through the HMD 102. Other materials can be used as well.

The lens elements 110, 112 can be formed of any material that can suitably display a projected image or graphic. Each of the lens elements 110, 112 can also be sufficiently transparent to allow a user to see through the lens element. Combining these two features of the lens elements can facilitate an augmented reality or heads-up display where the projected image or graphic is superimposed over a real-world view as perceived by the user through the lens elements.

The extending side arms 114, 116 can each be projections that extend away from the lens frames 104, 106, respectively, and can be positioned behind a user's ears to secure the HMD 102 to the user. The extending side arms 114, 116 can further secure the HMD 102 to the user by extending around a rear portion of the user's head. The wearable computing system 100 can also or instead connect to or be affixed within a head-mountable helmet structure.

The HMD 102 can include an on-board computing system 118, a video camera 120, a sensor 122, and a finger-operable touch pad 124. The on-board computing system 118 is shown to be positioned on the extending side arm 114 of the HMD 102. The on-board computing system 118 can be provided on other parts of the HMD 102 or can be positioned remote from the HMD 102. For example, the on-board computing system 118 could be wire- or wirelessly-connected to the HMD 102. The on-board computing system 118 can include a processor and memory, for example. The on-board computing system 118 can be configured to receive and analyze data from the video camera 120 and the finger-operable touch pad 124 (and possibly from other sensory devices, user interfaces, or both) and generate images for output by the lens elements 110 and 112. The on-board computing system can take the form of the computing system 300, which is discussed below in connection with FIG. 3.

With continued reference to FIG. 1A, the video camera 120 is shown positioned on the extending side arm 114 of the HMD 102; however, the video camera 120 can be provided on other parts of the HMD 102. The video camera 120 can be configured to capture image data at various resolutions or at different frame rates. One or multiple video cameras with a small form factor, such as those used in cell phones or webcams, for example, can be incorporated into the HMD 102.

Further, although FIG. 1A illustrates one video camera 120, more video cameras can be used, and each can be configured to capture the same view, or to capture different views. For example, the video camera 120 can be forward facing to capture at least a portion of the real-world view perceived by the user. The image data captured by the video camera 120 can then be used to generate an augmented reality where computer generated images appear to interact with the real-world view perceived by the user.

The sensor 122 is shown on the extending side arm 116 of the HMD 102; however, the sensor 122 can be positioned on other parts of the HMD 102. The sensor 122 can include one or more of a gyroscope, an accelerometer, or a proximity sensor, for example. Other sensing devices can be included within, or in addition to, the sensor 122 or other sensing functions can be performed by the sensor 122.

The finger-operable touch pad 124 is shown on the extending side arm 114 of the HMD 102. However, the finger-operable touch pad 124 can be positioned on other parts of the HMD 102. Also, more than one finger-operable touch pad can be present on the HMD 102. The finger-operable touch pad 124 can be used by a user to input commands. The finger-operable touch pad 124 can sense at least one of a position and a movement of a finger via capacitive sensing, resistance sensing, or a surface acoustic wave process, among other possibilities. The finger-operable touch pad 124 can be capable of sensing finger movement in a direction parallel or planar to the pad surface, in a direction normal to the pad surface, or both, and can also be capable of sensing a level of pressure applied to the pad surface. The finger-operable touch pad 124 can be formed of one or more translucent or transparent insulating layers and one or more translucent or transparent conducting layers. Edges of the finger-operable touch pad 124 can be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad can be operated independently, and can provide a different function.

Figure 1B:
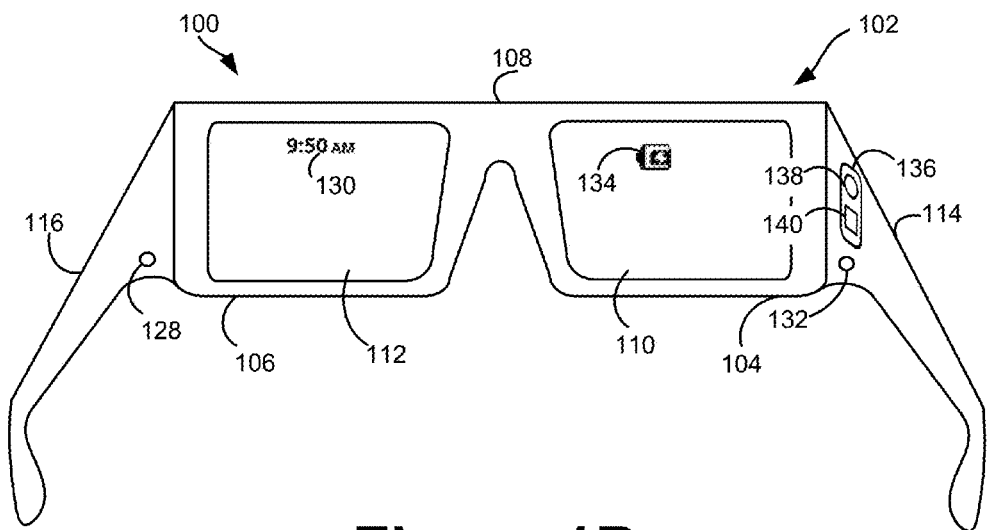

FIG. 1B illustrates an alternate view of the wearable computing system 100 illustrated in FIG. 1A. As shown in FIG. 1B, the lens elements 110, 112 can act as display elements. The HMD 102 can include a first projector 128 coupled to an inside surface of the extending side arm 116 and configured to project a display 130 onto an inside surface of the lens element 112. A second projector 132 can be coupled to an inside surface of the extending side arm 114 and can be configured to project a display 134 onto an inside surface of the lens element 110.

The lens elements 110, 112 can act as a combiner in a light projection system and can include a coating that reflects the light projected onto them from the projectors 128, 132. In some embodiments, a reflective coating may not be used (such as, for example, when the projectors 128, 132 are scanning laser devices).

In some embodiments, other types of display elements can also be used. For example, the lens elements 110, 112 themselves can include one or more transparent or semi-transparent matrix displays (such as an electroluminescent display or a liquid crystal display), one or more waveguides for delivering an image to the user's eyes, or one or more other optical elements capable of delivering an in focus near-to-eye image to the user. A corresponding display driver can be disposed within the frame elements 104, 106 for driving such a matrix display. Alternatively or additionally, a laser or LED source and scanning system could be used to draw a raster display directly onto the retina of one or more of the user's eyes.

The wink-detection system 136 is shown in FIG. 1B as a proximity-sensing system including a light source 138 and a light sensor 140 affixed to the extending side arm 114 of the HMD 102. Although the wink-detection system 136 is shown as a proximity-sensing system, other types of wink-detection systems can be used. As discussed below in connection with FIG. 2, a wink-detection system can also include other numbers of light sources (including no light sources) and can include elements other than those shown in the wink-detection system 136. Additionally, the wink-detection system can be arranged in other ways. For example, the light source 138 can be mounted separately from the light sensor 140. As another example, the wink-detection system 136 can be mounted to other frame elements of the HMD 102, such as, for example, to the lens frames 104 or 106, to the center frame support 108, or to the extending side arm 116.

Figure 1C:
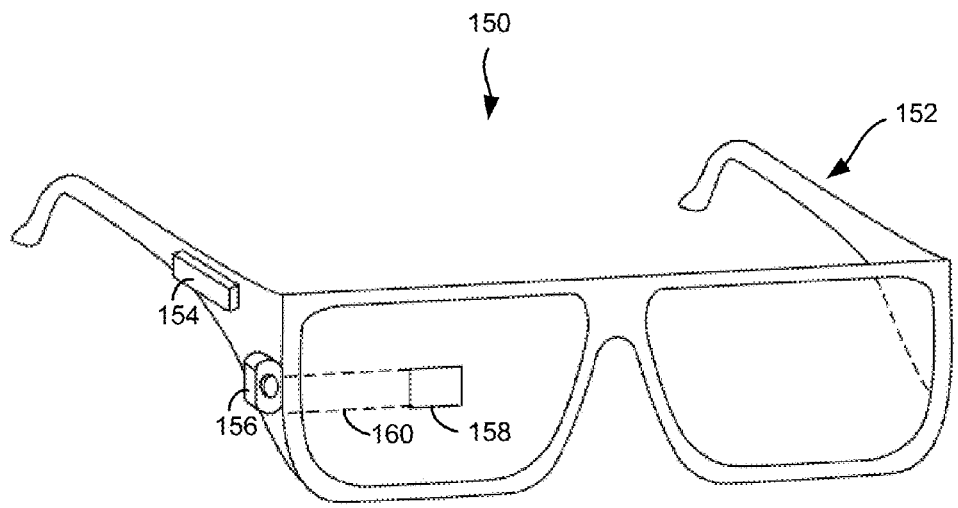
FIG. 1C illustrates another example of a wearable computing system.

FIG. 1C illustrates another example of a wearable computing system 150. The wearable computing system 150 includes an image-capturing system 156. The wearable computing system 150 can be coupled to a wink-detection system, although a wink-detection is not shown in FIG. 1C. While FIG. 1C illustrates an HMD 152 as an example of a wearable computing system, other types of wearable computing systems could be used. The HMD 152 can include frame elements and side arms such as those discussed above in connection with FIGS. 1A and 1B. The HMD 152 can also include an on-board computing system 154 and a video camera 156, such as those discussed above in connection with FIGS. 1A and 1B. The video camera 156 is shown to be mounted on a frame of the HMD 152; however, the video camera 156 can be mounted at other positions as well.

As shown in FIG. 1C, the HMD 152 can include a single display 158, which can be coupled to the HMD. The display 158 can be formed on one of the lens elements of the HMD 152, such as a lens element having a configuration as discussed above in connection with FIGS. 1A and 1B. The display 158 can be configured to overlay computer-generated graphics in the user's view of the physical world. The display 158 is shown to be provided in a center of a lens of the HMD 152; however, the display 158 can be provided in other positions. The display 158 is controllable via the computing system 154, which is coupled to the display 158 via an optical waveguide 160.

Figure 1D:
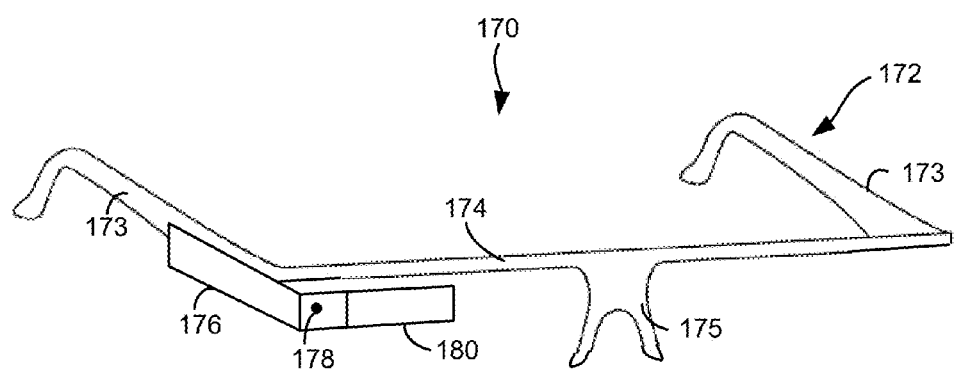
FIG. 1D illustrates another example a wearable computing system.

FIG. 1D illustrates another example of a wearable computing system 170. The wearable computing system 170 can include an image-capturing system 178 and a wink-detection system (not shown in FIG. 1D). The wearable computing system 170 is shown in the form of an HMD 172; however, the wearable computing system 170 can take other forms as well. The HMD 172 can include side arms 173, a center frame support 174, and a bridge portion with a nosepiece 175. In the example shown in FIG. 1D, the center frame support 174 connects the side arms 173. The HMD 172 does not include lens-frames containing lens elements. The HMD 172 can also include an on-board computing system 176 and a video camera 178, such as those discussed above in connection with FIGS. 1A and 1B.

The HMD 172 can include a single lens element 180, which can be coupled to one of the side arms 173 or to the center frame support 174. The lens element 180 can include a display, such as the display discussed above in connection with FIGS. 1A and 1B. The lens element 180 can be configured to overlay computer-generated graphics upon the user's view of the physical world. In an example, the single lens element 180 can be coupled to the inner side (the side exposed to a portion of a user's head when worn by the user) of the extending side arm 173. The single lens element 180 can be positioned in front of or proximate to a user's eye when the user wears the HMD 172. For example, the single lens element 180 can be positioned below the center frame support 174, as shown in FIG. 1D.

b. Proximity-Sensing Wink-Detection System

Figure 2:
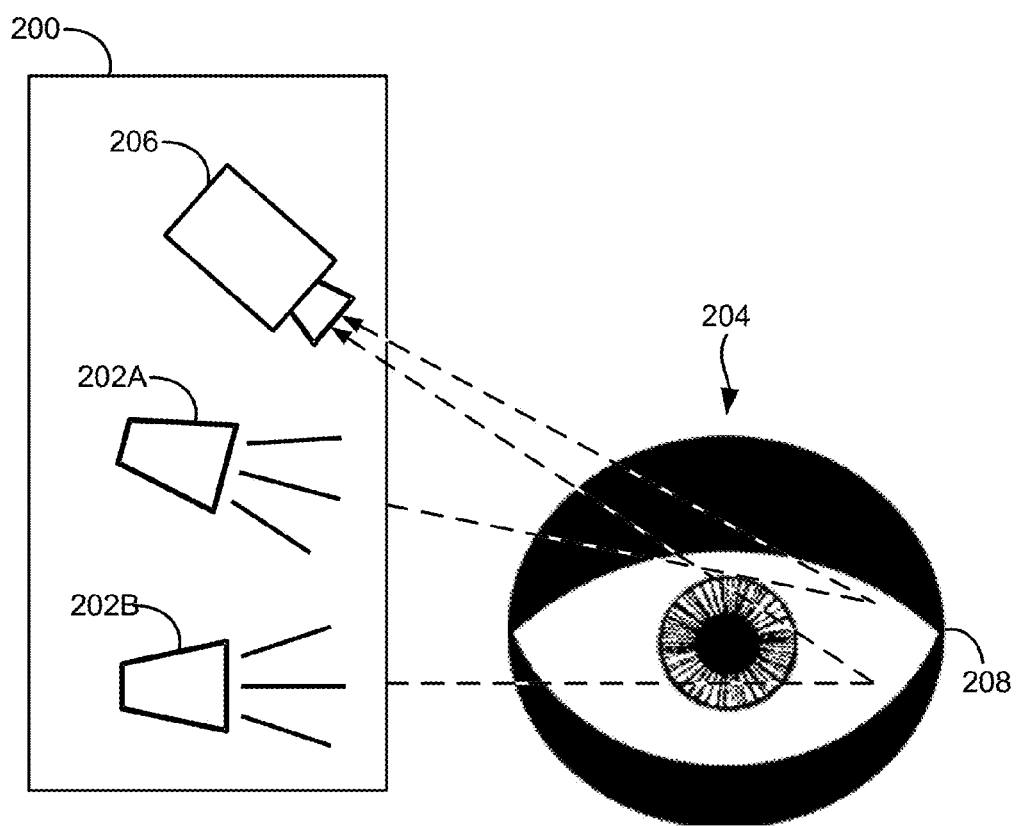
FIG. 2 illustrates an example of a wink-detection system.

FIG. 2 illustrates an example of a wink-detection system 200 interacting with an eye area 204. The eye area 204 can include the eye surface, eyelids, and portions of the face around the eye. The wink-detection system 200 includes two light sources 202A and 202B that are configured to provide light (light shown as dashed lines) to the eye area 204, and a light sensor 206 that is configured to detect reflected light (also shown as dashed lines) from the eye area 204. The wink-detection system can further include a processing unit (not shown in FIG. 2) that can perform computing functions. In particular, the processing unit can drive the light sources 202A-B, receive readings from the light sensor 206, process the readings to determine aspects of the eye area 204, or perform combinations of these functions, among other functions.

i. Light Source

The wink-detection system 200 is shown to use two light sources 202A-B to provide light to the eye area 204. While two light sources are shown, in general, a wink-detection system can use any suitable number of light sources to illuminate the eye area. Further, some wink-detection systems include no light sources. Instead, these systems can detect ambient light or other illumination coming from the eye area.

In systems using light sources, the light sources can be any type of light source. For example, the light sources can be light-emitting diodes (LEDs), laser diodes, incandescent sources, gas discharge sources, or combinations of these light sources, among other types of light sources. The light sources can be integrated with the system or externally connected to the system, and can be driven by a light sensor or a processing unit. The light sources can emit light of any suitable frequency or intensity. In an embodiment, the emitted light can have an intensity that is in a range that is safe for the user's eye. And the light can have a frequency that renders the light invisible to humans in order to avoid irritating the user. To this end, the light can be infrared light, near-infrared light, or the like. Note that some wink-detection systems can use visible light or high-intensity light, depending on the desired configuration of the wink-detection system.

In some embodiments, the light sources can be aimed at specific portions of the eye area. For example, the light sources 202A-B are aimed at an upper portion and a lower portion of the eye, respectively, near the inside corner 208 of the eye. In other cases, a single light source can be directed at the whole eye area or at a part of the eye area, such as, for example, at one eyelid or at the center of the eye. As another example, several light sources can each aim at respective various points on the eye area, illuminating the eye at each of the various points. Light sources can also differ in the amount of the eye area to which they provide light (termed a spot size). For example, one light source can have a spot size that provides light to the entire eye area, and another light source can focus on a relatively small point on the eye. Further, the shape of the illuminated area can influence the behavior of the system. For example, if a light source illuminates a narrow horizontal area across the top of the eye area, the amount of reflected light can depend on whether the upper eyelid covers that particular height. As another example, a light source that provides light to the entire eye area can allow a system to detect the difference between a completely closed eye and an eye that is almost completely closed.

In addition, a light source can use modulated or pulsed light to distinguish that light source from other light sources and from ambient light. In particular, each light source can be configured to pulse at a particular pattern so that the sensor can determine which light source sent the light based on the on/off pattern of the light. Because ambient light may not follow any such pattern, the light from the system's light sources can be distinguished from ambient-light noise by processing the measured light signal. Note that other light characteristics can be used to distinguish between light sources and/or ambient light. Examples of such light characteristics include frequency (color) and intensity of the light.

In some implementations, in an HMD that uses a light source, the light source can include a structured light scanner. The structured light scanner can be configured both to project light onto one or more surfaces, and to detect the light projection at the one or more surfaces. Of course, in some implementations, the structured light scanner can perform one of these functions, and another device or set of devices can perform the other function. When the HMD is worn, the structured light scanner can be aimed at a wearer's eye area. Accordingly, the structured light scanner can project light onto part or all of the eye area. In addition, the structured light scanner can detect the projected light, and based on the deformation of the detected light relative to the projected light, for example, the scanner can calculate information related to the shape of part or all of the eye area. The information can be calculated on a real-time basis. Accordingly, as the wearer's eye shape changes, the real-time information can be used to detect eye gestures.

The HMD need not include a structured light scanner for carrying out structured light scanning; instead, the HMD can include another device or set of devices configured to carry out structured light scanning, whether that device or set of devices is known or has yet to be developed. In addition, the structured light scanning can be performed with respect to light that is not visible to the human eye (such as, for example, infrared light) or with respect to light that is visible to the human eye. In addition, an HMD can include multiple light scanners, for example, to scan areas at and around both of the wearer's eyes. In a different configuration, an HMD can include a single light scanner that is configured to scan areas at and around both of the wearer's eyes.

Further, the light sources can include elements that allow the system to dynamically change the generated light's frequency, intensity, spot size, shape, focus, or combinations of these properties, among other types of properties. In addition, the light sources can couple with one or more mechanical actuators or servos to facilitate changing the light source's position, light direction, or both. In this way, the system can allow for dynamic calibration and adjustments of the light sources.

ii. Light Sensor

The wink-detection system 200 also includes a light sensor 206 that is configured to detect light reflected from the eye area 204. As used in this disclosure, the term "reflected" can refer to a variety of interactions between light and an eye area, including those interactions that direct the light toward a light sensor. Examples of such interactions include mirror reflection, diffuse reflection, and refraction, among other scattering processes. The sensor can be any type of light-sensitive element or device that is capable of outputting a measurable change in response to changes in light intensity. For instance, the sensor can be a photodiode, an electro-optical sensor, a fiber-optic sensor, or a photo-detector, among other examples. Further, the sensor can be configured to detect a specified frequency of light or a specified range of frequencies. In some implementations, the sensitivity of the sensor can be designed for specified frequencies and intensities of light.

The sensor can be positioned to detect light reflected from particular portions of the eye area. For example, the sensor can be positioned above the eye to detect light reflecting from the top of the eye when the eye is open, and from the upper eyelid when the eye is closed. In this way, the sensor can detect the amount of the eye that the upper eyelid covers. In some embodiments, the light sensor can be aligned at an oblique angle with respect to the eye area (for example, according to the configuration of the sensor 140 shown in FIG. 1B). In other arrangements, the sensor can point directly at the eye area and can be aimed toward the center of the eye area.

In some arrangements, the system can detect light reflected from a second eye area. For example, the system can receive light data from another light sensor, which can detect light from a user's other eye area. Alternatively, one light sensor can be positioned to detect light from both eye areas.

In addition, the system can adjust and calibrate the behavior of the sensor, for example, by changing the sensor's position, direction, frequency response, sensitivity, detectable area size or shape, or combinations of these, among others. This can be performed based on the context in which the system is used—for example, whether the system is calibrated to a particular user, an intensity of ambient light, the light sources used, a battery level of the device, or the like. For example, the sensor can be coupled to mechanical actuators for changing its position and direction. As another example, the sensor can include changeable filters and baffles for filtering out different frequencies of light.

A sensor that detects light from multiple sources can differentiate between the signals from each light source. For example, if the system uses a different pulsing pattern for each light source, then the sensor can separate signals based on the detected pulsing characteristics of detected light. Additionally, the light sources can alternate when they illuminate the eye area. In such an arrangement, the sensor can associate a measurement of light with a source based on which source was on at the time that the light was measured. If the light sources illuminate different sections of the eye area, then the separate signals can be further associated with the respective eye-area portions. In other arrangements, the sensor can measure a single light intensity based on light from all the sources, without differentiating between the sources.

c. Other Wink-Detection Systems

Other wink-detection systems can include one or more cameras configured to capture video or still images of an eye area. Based on the captured video or still images, a system can recognize movements of the eye and eye area and, in particular, can determine wink gestures.

Other wink-detection systems can use mechanical sensors to detect the motion of a user's eyelids and, from the detected motion, determine that the user is winking. As an example, a wink-detection system can be equipped with an electromyogram or a similar device that is configured to evaluate electrical activity that is produced by skeletal muscles at the wearer's eye area of interest; such a device can be used, in essence, to "hear" movements of muscles at the eye area. As another example, the wink-detection system can be equipped with a vibration detector that is configured to detect relatively subtle vibrations at the wearer's eye area of interest. This disclosure is not limited to the wink-detection systems discussed above; this disclosure contemplates any wink-detection system that is known or has yet to be developed.

In addition, although the wink-detection systems are discussed above in the context of detecting wink gestures, each of the wink-detection systems discussed above can be configured more generally to function as an eye-gesture detection system that is configured to detect not only wink gestures, but also other eye gestures, such as a squint or a blink.

d. Processing and Other Elements

The processing unit in the wink-detection system can be a general-purpose processor, a specialized processor, or both. The processor can be integrated with the light sensor or sources, or the processor can connect to the light sensor and sources through a bus or network connection. Further, the processor can include or connect to a non-transitory computer-readable medium, such as a hard disk, a memory core, a memory drive, a server system, or a combination of these, among others. The computer-readable medium can store at least the program instructions for directing the processor to execute the functions associated with any method provided in this disclosure.

The wink-detection system can include various other elements including, for instance, additional processing, sensing, lighting, or interface elements. Some wink-detection systems can include a motion sensor (a gyroscope or an accelerometer, for example) to detect when the system moves. This can enable the system, for example, to determine whether a change in detected light could be due to a movement of the light sensor, with respect to the eye area, as opposed to a movement of the eyes or eyelids.

In some implementations, the wink-detection system can be integrated in or with a computing system, such as the wearable computing systems discussed above in connection with FIGS. 1A-1D. In these implementations, the wearable computing systems can help a user to interface with the wink-detection system, for instance, to specify user preferences, change system settings, perform calibration processes, or perform any combination of these functions, among other functions.

Figure 3:
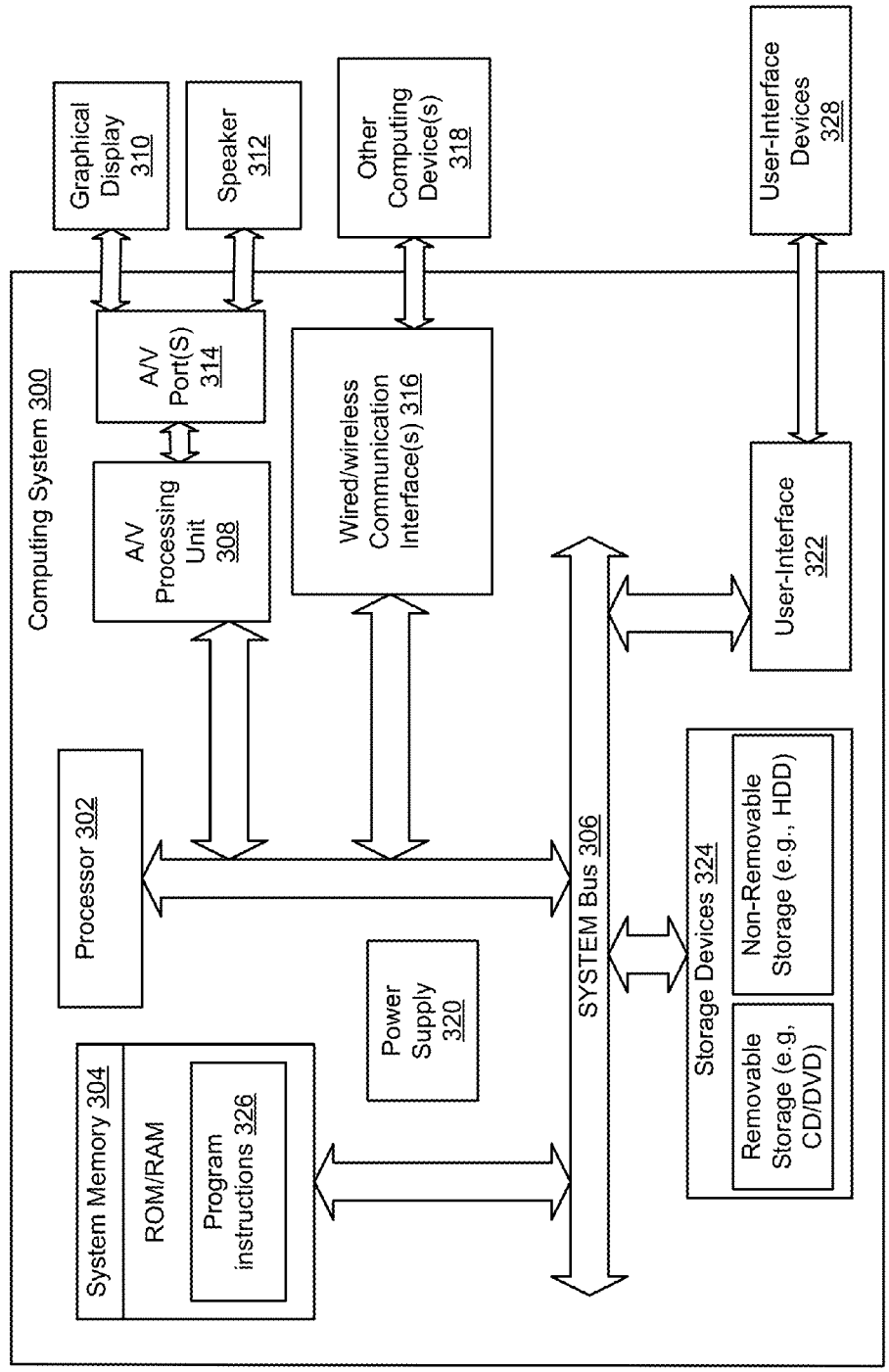
FIG. 3 illustrates an example of a computing system.

FIG. 3 illustrates an example of a computing system 300. The computing system 300 can include at least one processor 302 and system memory 304. In an implementation, the computing system 300 can include a system bus 306 that communicatively connects the processor 302 and the system memory 304, as well as other components of the computing system 300. Depending on the desired configuration, the processor 302 can be any type of processor, such as, for example, a microprocessor (µP), a microcontroller (µC), a digital signal processor (DSP), or any combination of these, among others. Furthermore, the system memory 304 can be of any type of memory now known or later developed including but not limited to volatile memory (such as RAM), non-volatile memory (such as ROM, flash memory, or the like) or any combination of these.

The computing system 300 can include various other components as well. For example, the computing system 300 includes an A/V processing unit 308 for controlling the graphical display 310 and the speaker 312 (via the A/V port 314), one or more communication interfaces 316 for connecting to other computing devices 318, and a power supply 320. The graphical display 310 can be arranged to provide a visual depiction of various input regions provided by the user interface 322. Note, also, that the user interface 322 can be compatible with one or more additional user-interface devices 328 as well.

Furthermore, the computing system 300 can also include one or more data storage devices 324, which can be removable storage devices, non-removable storage devices, or a combination of these. Examples of removable storage devices and non-removable storage devices include magnetic disk devices such as flexible disk drives and hard-disk drives (HDD), optical disk drives such as compact disk (CD) drives or digital versatile disk (DVD) drives, solid state drives (SSD), or a combination of these, among any other storage device now known or later developed. Computer storage media can include volatile and nonvolatile, removable and non-removable media.

The computing system 300 can communicate using a communication link 316 (a wired or wireless connection) to a remote device 318. The remote device 318 can be any type of computing device or transmitter including a laptop computer, a mobile telephone, or tablet computing device, or the like, that can be configured to transmit data to the computing system 300. The remote device 318 and the computing system 300 can contain hardware to enable the communication link 316, such as processors, transmitters, receivers, antennas, or the like.

In FIG. 3, the communication link 316 is illustrated as a wireless connection; however, wired connections can also be used. For example, the communication link 316 can be a wired serial bus such as a universal serial bus or a parallel bus, among other connections. The communication link 316 can also be a wireless connection using, for example, Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The wired or wireless connection can be a proprietary connection as well. The remote device 330 can be accessible via the Internet and can include a computing cluster associated with a particular web service such as, for example, social networking, photo sharing, or address book.

3. Operation

Figure 4:
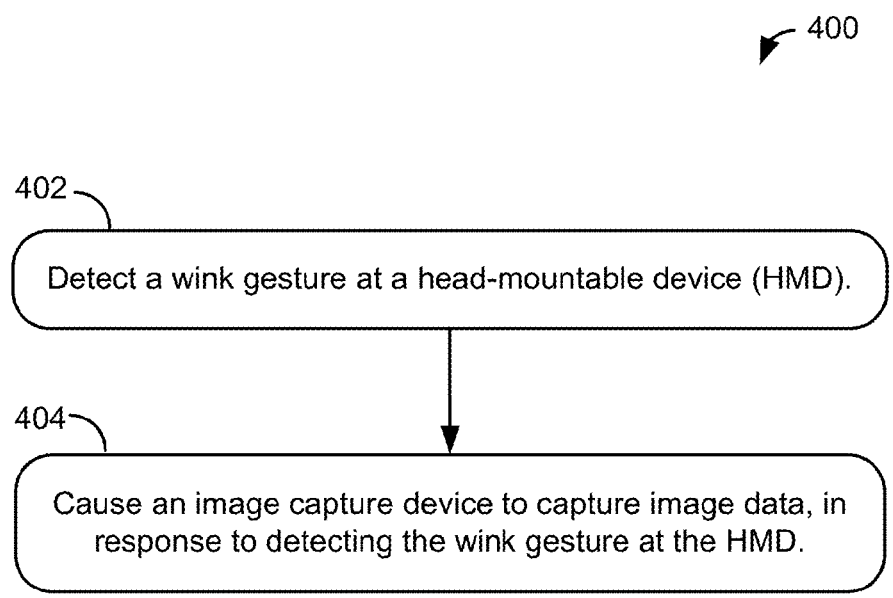
FIG. 4 is a flow chart illustrating a method, according to an embodiment.

FIG. 4 is a flow chart illustrating a method, according to some embodiments. At block 402, the method 400 involves detecting a wink gesture at an HMD. At block 404, the method 400 involves causing an image capture device to capture image data, in response to detecting the wink gesture at the HMD.

a. Detecting a Wink Gesture

As mentioned above, at block 402, the method 400 involves detecting a wink gesture at an HMD. A wink gesture can be detected in various ways. For instance, a camera-based system can capture video or still images that show both of a user's eyes. Then, the system can recognize a wink gesture when one of the user's eyes closes. As another example, a camera-based system can capture images of one of the user's eyes and recognize a wink gesture from characteristics of this eye's movement. For instance, a winking eye can tend to close slower than a blinking eye, or the eyelid and skin around a winking eye can be more wrinkled or strained than the corresponding eye area of a user that is closing both eyes.

Another wink detection system can measure the physical movements of a user's eyelids by physically interacting with a user's eyelids. For example, a system can track the movements of mechanical actuators that are connected to a user's eyelids. As another example, a system can wirelessly receive motion data from motion sensors affixed to the user's eyelids. In either case, or in similar systems, the system can detect the closure of a single eye and responsively determine that the eye is winking.

The following discussion describes functions of a proximity-sensing system in the process of detecting a wink. The following description merely serves as an example and should not be construed to indicate that a proximity-sensing technique is more favorable than another wink-detection technique.

i. Providing Light to an Eye Area

As discussed above, a wink-detection system can include one or more light sources. These light sources can be controlled by a light sensor or a processing unit. When in use, the light sources can provide light to portions of an eye area. The eye area can include the user's eye surface, eyelids, and portions of the face around the eye. The light sources can provide light to some or all of the eye area.

The method 400 can involve the system providing light to the eye area by way of one or more light sources. The light sources can constantly provide light to portions of the eye, or they can provide light to the eye intermittently. For example, the sources can alternate being on and off to facilitate distinguishing between the signals from each light source. Further, the on/off characteristics can help a sensor to differentiate between ambient light and artificial light signals. In some embodiments, a system can include both always-on and intermittent light sources.

Because facial structures can vary on a user-by-user basis, some systems can calibrate the direction, position, and spot size/shape characteristics of the light sources based on detected facial characteristics. For example, a system can determine the direction from the light sources to the center of an eye area using, for example, gaze tracking, glint detection, or video recognition. Then, the system can modify the arrangement of light sources so that at least one light source is aimed at the area around the center of the eye area.

ii. Receiving Light Data from a Light Sensor

The method 400 can involve the system receiving light data from a light sensor. The light data indicates at least one characteristic of light reflected from the eye area. The sensor can be configured to detect certain aspects of the light, such as frequency and intensity of the light. The sensor can detect other aspects of the detected light, such as polarization, coherence, phase, spectral width, modulation, or combinations of these aspects, among other aspects.

The light sensor can be arranged to detect light reflected from a particular portion of the eye area or to detect light from the entire eye area. Additionally, the sensor can be specially designed to detect light with certain attributes, such as, for example, a certain frequency of modulation, a frequency of light, light with a particular polarization, or combinations of these attributes, among other attributes.

Further, the system can calibrate and adjust the characteristics of the sensor. For example, if the sensor is used with near-IR light sources, the sensor can be configured to filter out light that is not in the near-IR frequency range to avoid a noisy signal. As another example, if a wink-detection system is mounted high above the eye area, the system can detect the position of the eye and responsively aim the sensor lower to capture the eye area. As another example, in response to detecting that the light sources are not as bright as they were previously, the system can increase the sensitivity of the sensor to compensate for the lower light intensity.

The light data from the sensor can be received as discrete light-intensity measurements over time. Also, light data can represent one combined signal from all light sources and eye-area portions, or the data can include multiple data sets with each data set representing a particular light source or detected portion of the eye area.

The intensity of light detected from a portion of the eye can change based on the characteristics of the eye at the specified point. In particular, a sensor can detect more light when aimed at the skin surrounding the eye (including the eyelids) than it detects when aimed at the surface (the sclera, cornea, or the like) of the eye, because of, among other considerations, the different light-scattering characteristics of human skin and eye surface. Therefore, an increase in detected light from a particular portion of the eye area can be indicative of an eye movement that increases the amount of skin that occupies the portion of the eye area from which the sensor is detecting light. For example, a sensor that detects light from the surface of an eye when the eye is open (relatively less light) can also detect light from the eyelid when the eye is closed (relatively more light).

Figure 5:
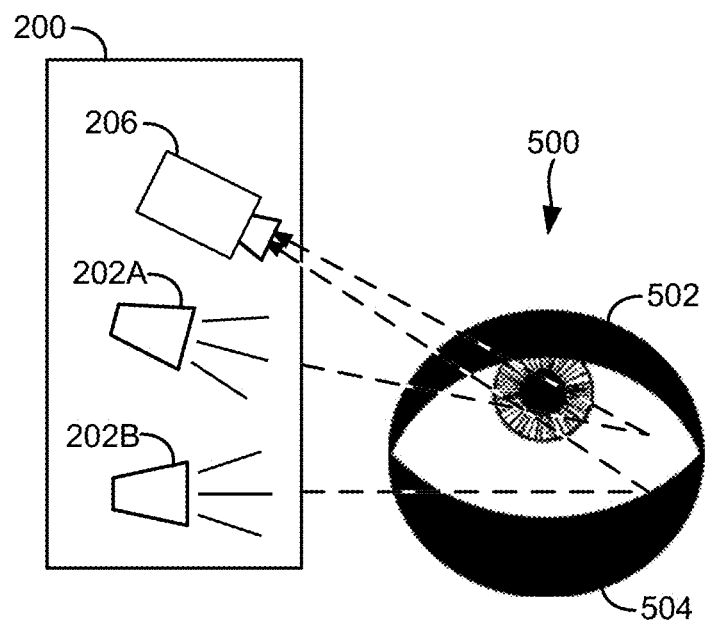
FIG. 5 illustrates the wink-detection system of FIG. 2 interacting with an eye area of an upward-looking user.

In addition to representing an eye closing movement, an increase in light intensity detected by the sensor can represent other eye movements. For example, FIG. 5 shows the detection system 200 of FIG. 2 interacting with an eye area 500, in which the eye is looking up. As shown, the bottom eyelid 504 has moved up into the path of the light provided by the source 202B. The intensity of the light detected by the sensor 206 and provided by the light source 202B, therefore, can increase as a result of the eye movement, because more skin would be illuminated by this source than in the situation depicted in FIG. 2. Meanwhile, the light provided by the source 202A still illuminates the top of the eye, without illuminating the eyelid 502 as it does in the situation of FIG. 2. Hence, the intensity of light detected from the source 202B can remain unchanged, and the overall detected light intensity from both sources can therefore increase as a result of the eye movement.

Figure 6:
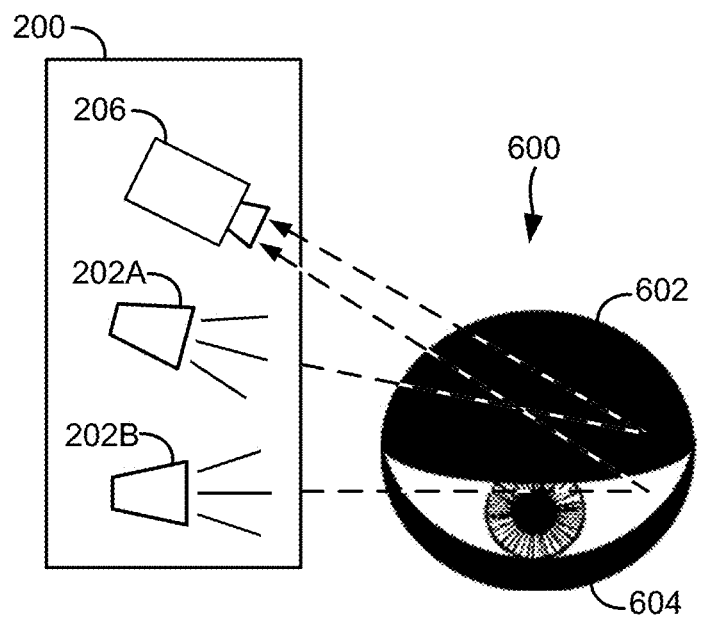
FIG. 6 illustrates the wink-detection system of FIG. 2 interacting with an eye area of a downward-looking user.

As another example, FIG. 6 shows the detection system 200 interacting with an eye area 600, in a scenario in which the eye is looking down. As shown, the user's top eyelid 602 has moved down and into the path of the light provided by the source 202A. The intensity of the light detected by the sensor 206 from the light source 202A, therefore, can increase as a result of the eye movement, because more skin can be detected than in the situation depicted in FIG. 2. Meanwhile, the light from the source 202B still does not illuminate the top eyelid 602. Hence, the intensity of light detected from the source 202B would remain unchanged, and the overall detected light intensity from both sources can increase as a result of the eye movement.

iii. Detecting Data Indicating a Wink Gesture

The method 400 can involve detecting data indicating a wink gesture, based on the received light data. The light-scattering characteristics of the skin and eye surface are such that when the eye closes, the light detected by the wink-detection system can increase due to an increase in the area of skin that reflects light (or as a result of a decrease in the area of the eye that reflects light). Therefore, an increase in light can be the result of a wink gesture.

Additionally, the characteristics of a light increase can indicate whether the corresponding eye movement is a wink or some other movement. For example, the amount of the increase can indicate whether the eyes are partially closed (as in a squint) or fully closed (as in a wink). As another example, the movement of closing a single eye (wink) can be slower than the movement of closing both eyes (blink).

Figure 7A:
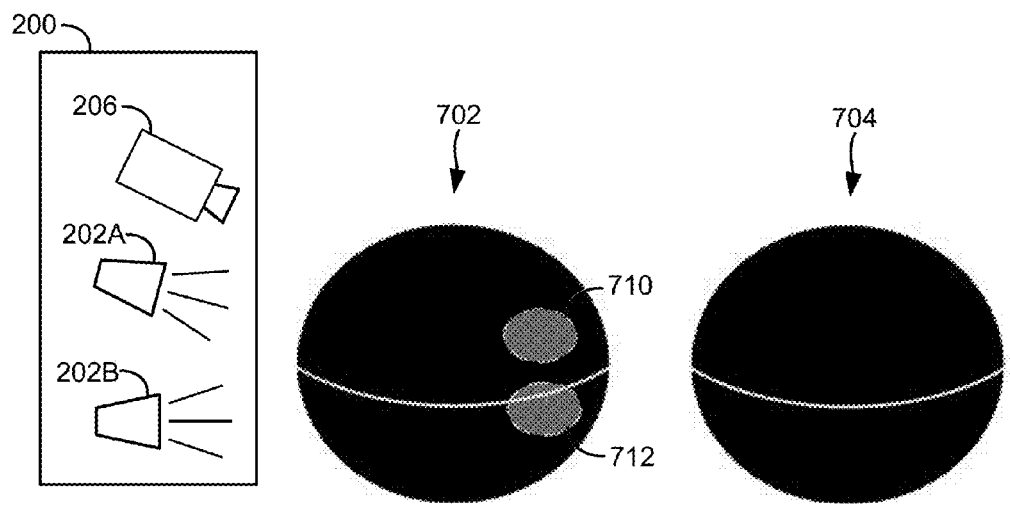
FIG. 7A illustrates the wink-detection system of FIG. 2 interacting with an eye area of a blinking user.
Figure 7B:
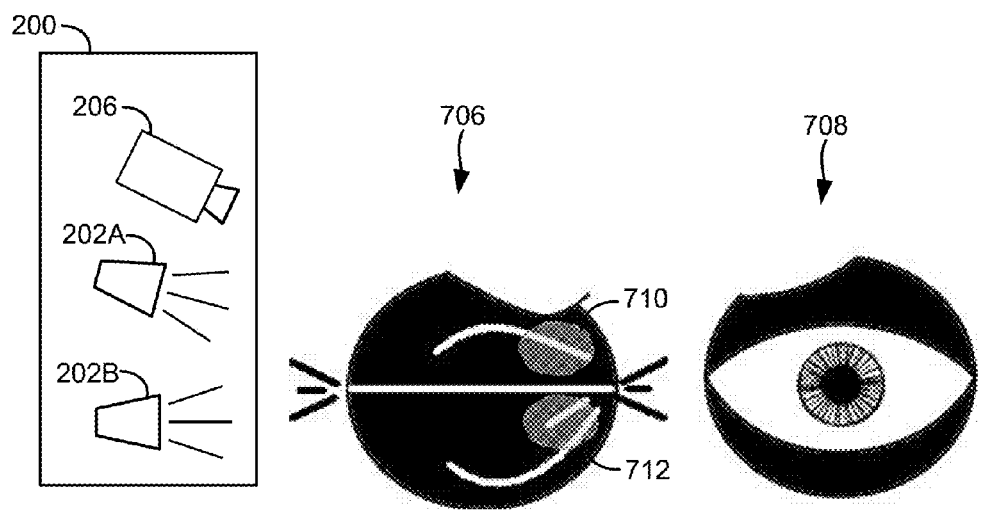
FIG. 7B illustrates the wink-detection system of FIG. 2 interacting with an eye area of a winking user.

More particularly, the increase in light that results from a blink gesture can be smaller than the increase in light that results from a wink gesture. For example, in a wink gesture, the eyelids and skin around the eye can wrinkle more than in a blink gesture. The resulting wrinkles can reflect more light to the sensor than the flat skin associated with a blink gesture would reflect. To illustrate, FIGS. 7A and 7B show the wink detection system 200 interacting with blinking (FIG. 7A) and winking (FIG. 7B) eyes. As shown, the blinking eyes 702 and 704 close flatly, so that the light spots 710 and 712 illuminate flat eyelid skin on the eye 702. In contrast, the eyes 706 and 708 are involved in a winking gesture. Due to the winking gesture, the eyelid and skin near the eye 706 is flexed and wrinkled (wrinkles shown as solid lines). Therefore, the same illuminated spots 710 and 712 encounter folded and stressed skin on the eye 706. Hence, the light reflected from the winking eye 706 can be different from the light reflected by the blinking eye 702.

To distinguish a wink from other eye movements, the wink-detection system can store data indicating the amount of light that reflects to a sensor as a result of a wink gesture, and data indicating the light intensity that results from other eye movements (such as a blink gesture, a squint gesture, or a change in gaze direction). Then, when an eye movement is detected, the system can compare the current light intensity to the stored data indicating the relative light intensities to determine whether or not the eye movement is the result of a wink gesture. The stored data can indicate the maximum or average amplitudes of light intensity associated with each eye movement. In some cases, the data can also indicate the time-based changes in light intensity that result from various eye movements. For example, because an eye can close slower in a wink than in a blink, the stored data can indicate a corresponding slower change in detected light intensity resulting from a wink gesture than from a blink gesture. Further, the system can use the duration of a wink, the eye-opening speed after the closure, changes in intensity while the eye is closed, or the like as bases for determine that a particular change in light indicates a wink gesture.

Depending on the portions of the eye that are illuminated and measured, a wink can be detected in different ways. For example, in the system 200, the light from the top and bottom eyelids can be separately measured, and increases in detected light can be recognized for each eyelid. In other arrangements, the movement of a single eyelid can be tracked, or the overall eye area can be measured.

In some implementations, a system can measure light from both of a user's eyes to confirm a detected wink gesture. In particular, once a system has detected light data from a first eye area that indicates a wink gesture, the system can compare these data to light data from the second eye area. By comparing the data from each eye area, the system can verify that a given action of the user's eyes corresponds to a wink gesture.

b. Determining a Gaze Direction

In addition to detecting a wink gesture, the system can determine a gaze direction, which can represent the direction along which the eye is oriented while winking (and before or after the wink). In particular, the method 400 can involve determining a gaze direction, based on the detected wink gesture. The system can determine the gaze direction based on characteristics of the eye area before, during, or after a detected wink gesture.

In some implementations, the system can determine the gaze direction by collecting and analyzing data other than the data used to detect the wink gesture. For example, a system can use a gaze tracker to track the movement of a user's pupil, glint, or other gaze-direction characteristics. Then, when the system detects a wink gesture, the system can use the last tracked position of the user's eye to determine the gaze direction. In particular, the system can store data representing a central position of the pupil (when the user is looking straight forward). Then, the system can estimate the difference between the central position and the detected position of the pupil and calculate a corresponding angular difference between the central position and the detected position. The calculated angle can therefore represent the difference between a "looking straight forward" gaze direction and the detected gaze position.

In some implementations, the gaze direction can be determined based on the same data that the system uses to detect the wink gesture. For example, in a camera-based system, the system can be programmed to recognize the eye position from the captured video or still images that are also used to recognize the winking motion. In particular, the system can track the movements of the user's pupil, with respect to other parts of the user's face, before the wink gesture. Then, when a wink gesture is detected, the system can refer to the tracked movement data to determine the position of the pupil before the wink gesture. Similarly, the system can determine the gaze direction from the position of the user's pupil immediately following the blink gesture.

The wink-detection system using proximity sensing can also determine the gaze direction from much or all of the same data as was used to detect the wink gesture. In particular, as shown in the situations depicted in FIGS. 2, 5, and 6, the characteristics of the detected light can change based on the direction along which the eye is oriented before and after winking. For example, the light detected by the system 200 can increase as a result of an eye looking either up (as in FIG. 5) or down (as in FIG. 6). Hence, if the system 200 is configured to differentiate between the signals from the source 202A and the signals from the source 202B, the increases in light intensity from each source can be associated with corresponding eye movements.

To facilitate associating light-intensity data with eye-movement information, the system can collect and store representative light-intensity data for known eye movements. For example, the system can be programmed with characteristic light-intensity levels that correspond with a particular gaze direction. Alternatively, user-specific data can be gathered. For instance, a user can be instructed to follow a calibration procedure to store particular intensity data associated with the particular user's facial characteristics. In particular, the system can prompt the user to look in different directions, such as, for example, by using audio or text commands, or by displaying an indicator in the direction that the user should be looking. Then, the system can store the intensity of light that is detected from the user's eye area while the user is looking in the different directions.

Further, the system can adjust the representative light-intensity levels to better match the associated gaze directions. In particular, if the system determines that a representative level does not correctly represent the light that can be detected when the eye is looking in the associated gaze direction, then the system can responsively adjust the representative level to a level that does represent the light that can be detected when the eye is looking in the gaze direction. For example, if the system detects that the most common detected light-intensity level (likely associated with a user looking straight ahead) is much lower than the recorded intensity level associated with the straight ahead gaze direction, the system can responsively lower the representative level to match the previous readings.

In addition, the system can calibrate the stored list of light-intensity levels for a particular context in which the method is used. For example, a system that is used by multiple users can store representative light-intensity levels for each user. When the user changes, the system can responsively change the list of levels that it uses.

The system can then compare light-intensity levels before and/or after the wink gesture to the characteristic or recorded readings. By matching the detected intensity level(s) to representative levels, the system can determine a possible gaze direction at the time of the wink.

Additionally, the system can store characteristic or user-specific light-intensity data related to gaze directions with an eye in a closed state (for example, with the eye winking) Then, the intensity level detected during a wink can be compared to the stored eye-closed intensity levels. In this way, the gaze direction can be determined by the light data received during the wink in addition to the light data received before and after the wink.

In some embodiments, the system can determine a gaze direction without referring to a list of representative data. For example, if the wink gesture occurs while the eye is looking forward, the difference between the light-intensity level before the wink gesture and the light-intensity level during the wink gesture can be much larger than if the user were looking either up or down. Therefore, the system can determine a first light-intensity level associated with an eye-open state and a second light-intensity level associated with an eye-closed state. Further, the system can determine that the difference in light intensity is greater than a non-zero threshold difference and, based on this determination, determine that the gaze direction is an intermediate vertical direction (i.e., between an upward and a downward direction). Similarly, the system can determine that the gaze direction is one of an upward direction and a downward direction, in response to determining that the difference in light intensity is not greater than a non-zero threshold. Similar procedures can be used for comparing the intensity during a wink to the intensity after the wink.

c. Capturing Image Data

With reference to FIG. 4, at block 404, the method 400 involves causing an image capture device to capture image data, in response to detecting the wink gesture at the HMD. As used in this disclosure, the term "image data" can refer to various types of data; the meaning of the term "image data" can depend on the context in which the term is used. In some contexts, the term "image data" can refer to a raw image file (or to multiple raw image files). The raw image file can represent unprocessed or minimally processed data from an image sensor of a camera, such as a digital camera or an image scanner, among other types. Examples of raw images files include camera image file format (CIFF) and digital negative (DNG). Note that this disclosure contemplates any other suitable type of raw image file. In some contexts, the term "image data" can refer to data in a format that can be rasterized for use on a display; examples include RAW images, Portable Network Graphics (PNG) images, Joint-Photographic Experts Group (JPEG) compressed images, Bitmap (BMP) images, and Graphics Interchange Format (GIF) images, among various other types. In some contexts, the term "image data" can refer to data in a vector format, such as, for example, an eXtensible Markup Language (XML) based file format; an example includes Scalable Vector Graphics (SVG), among other types. In some contexts, the term "image data" can refer to data that is in a graphics pipeline along a rendering device, such as a graphics processing unit (GPU) or a central processing unit (CPU), among others. In some contexts, the term "image data" can refer to data that is stored in a display's video memory (such as, for example, random access memory (RAM)) or in graphics card. In some contexts, the term "image data" can refer to data that includes light-field information, such as, for example, four-dimensional (4D) light-field information. In this example, the data can represent raw data that is captured by, for example, a plenoptic camera (sometimes termed a "light-field camera"), or the data can represent a processed version of such raw data. Note that the term "image data" can encompass various types of data, can be of various file formats, and can be stored to various mediums, whether those types of data, file formats, and mediums are known or have yet to be developed.

The image data can be, but need not be, data that was captured by a camera. Accordingly, the image capture device can be, but need not be, a camera. As an example, the image data can represent a still image of an already captured video, whether the still image is in the same file format as the video or in a different file format from the video. In this example, the image capture device includes any combination of the hardware, firmware, and software that is used to generate the still image from the frame of the video. Of course, in this example, the image data can represent multiple still images of the video. As another example, the image data can represent a screenshot of a display. These examples are illustrative only; image data can be captured in various other ways.

In this disclosure, when an action is said to be performed in connection with captured image data, the action can be performed directly on the image data itself, can be performed on a processed version of the image data, can be performed on different image data entirely, or can be performed on a combination of these. The different image data can be a duplicate of the captured image data, a processed version of the captured image data, or a portion of the captured image data. For example, in some contexts, when image data is said to be sent to a recipient, the image data itself can be, but need not be, sent to the recipient; instead, different image data (a duplicate, a processed version, a portion, or the like) can be sent to the recipient.

Also, in some contexts, this disclosure refers to "image data" as an "image" or as "images" for ease of explanation.

In some implementations, the image data can represent a point-of-view image. As used in this disclosure, a "point-of-view image" can be an image portraying the perspective of an actual user or it can represent a perspective that a user would have if the device were being worn. A device can capture the point-of-view image or send an image-capture instruction to cause an image-capturing system to capture the point-of-view image. In some cases, the device can refrain from capturing a point-of-view image in response to detecting a wink with certain characteristics. For example, a device can refrain from capturing image data in response to detecting a wink that lasts for a relatively short threshold duration.

A point-of-view image can be captured by one or more outward-facing video cameras, still-picture cameras, light sensor arrays, or other image-generating systems or devices. The image-capturing device can be fixed in position and direction, or can be movable on the device. In some cases, the image-capturing device can be movable by the processing components of the HMD. In this way, a device can change the direction and position of an image-capturing device automatically. In other arrangements, instead of physically moving a narrow-angle device to face a different direction, the image-capturing device can capture a wide-angle image and then crop the image to store a particular direction in the captured image.

In some arrangements, the instruction to capture the image (whether instructing integral, local, or remote image-capturing systems) can contain specific instructions on how to perform the image capture. For example, the instructions can direct the image-capturing device to focus the capture on a point or part of the device's field of view. In particular, the image-capturing device can be configured to have an imaging field of view, which includes at least a portion of the field of view of the device's user. As such, locations within the field of view of the wearer can be mapped to locations within the imaging field of view of the image-capturing device. In this way, the gaze direction can be directed toward a point or area of interest within the field of view of the user. The point or area of interest within the field of view of the user can then be mapped to a corresponding location within the imaging field of view of the image-capturing device. Accordingly, the image capture instruction can be generated to indicate the corresponding location within the imaging field of view on which the image-capturing device should focus, thereby focusing on areas in the direction along which the user is looking.

In some embodiments, a device can capture image data in response to one or more winks during which the eye is oriented along a certain direction. In particular, the device can make a determination whether the gaze direction is one of a predetermined set of directions and then capture image data in response to determining that the gaze direction is one of the predetermined directions. For example, the device can store a range of directions that are "on screen" and a range of directions that are "off screen". When the user is looking relatively forward (i.e., towards an intermediate vertical direction, as shown in FIG. 2) when winking, the device can recognize the wink gesture as on-screen winking and responsively capture a point-of-view image. In contrast, when the user is looking upward or downward while winking, the device can recognize the wink gesture as off-screen winking and responsively refrain from capturing the point-of-view image.

In addition to capturing image data, a device can perform other actions in response to detecting the wink gesture. For example, the device can present a notification of the image capture. As another example, the device can responsively transmit the captured image data to other devices or servers.

d. Detecting a Secondary Gesture at an HMD

As discussed above, the method 400 involves detecting a wink gesture at an HMD. Some implementations of the method 400 can also involve detecting a secondary gesture at the HMD. In addition, some implementations of the method 400 can involve causing an image capture device to capture image data, in response to detecting the secondary gesture at the HMD.

i. Secondary Gesture

The term "secondary gesture," as used in this disclosure, generally refers to an action or combination of actions that a wearer of an HMD (or simply "wearer") performs in addition to a wink gesture. Accordingly, when a wink gesture is discussed in connection with the secondary gesture, the wink gesture is sometimes referred to as a "primary gesture" for ease of explanation. Depending on the desired implementation, a secondary gesture can encompass an intentional gesture (such as, for example, a change in the wearer's gaze direction), an unintentional gesture (such as, for example, a reflexive blink), or both. In addition, the term "secondary gesture" can also encompass inactivity, depending on the context in which the term is used.

The meaning of the term "secondary gesture," when used in connection with an HMD, can depend on the configuration of the HMD. Several HMD configurations serve as illustrative examples. A first illustrative HMD configuration can recognize a secondary gesture as an action or a combination of actions that is performed in connection with the HMD. In this HMD configuration, the action or combination of actions is said to serve as the secondary gesture, or in other words, result in a detection of the secondary gesture. A second illustrative HMD configuration can recognize a secondary gesture as inactivity with respect to the HMD. In this HMD configuration, the inactivity serves as the secondary gesture. A third illustrative HMD configuration can recognize a secondary gesture as a combination of inactivity with a suitable action or combination of suitable actions. In this HMD configuration, the combination of inactivity with a suitable action or combination of suitable actions serves as the secondary gesture.

When an HMD is worn, its configuration can permit an eye-related action to serve as a secondary gesture. Several illustrative examples of eye-related actions follow. As a first illustrative example, a squint gesture can serve as a secondary gesture. The squint gesture can take the form of a squint gesture as discussed above. The squint gesture can include a squint of one or both of the wearer's eyes. In addition, the squint gesture can include one squint or multiple squints. As a second illustrative example, a blink gesture can serve as a secondary gesture. The blink gesture can take the form of a blink gesture as discussed above. A blink gesture typically includes a blink of both of the wearer's eyes, but the blink gesture can also be a blink of just one of the wearer's eyes. In addition, the blink gesture can include a single blink or multiple blinks; the multiple blinks can include one blink of each of the wearer's eyes or multiple blinks of the same eye. As a third illustrative example, a change in gaze direction can serve as a secondary gesture. The change in gaze direction can be as discussed above. As a fourth illustrative example, the secondary gesture can take the form of another wink gesture—in other words, a wink gesture in addition to the primary gesture.

Some examples in this disclosure discuss situations in which the wearer performs the secondary gesture while performing the wink gesture. In these examples, the wearer's winking eye is closed when the wearer performs the secondary gesture; therefore, in these examples, an eye-related action that serves as a secondary gesture is performed using the wearer's other eye.

When an HMD is worn, its configuration can permit an action other than an eye-related action to serve as a secondary gesture. Several illustrative examples of these actions follow. As a first illustrative example, a threshold movement of an HMD can serve as a secondary gesture. To this end, the HMD can include a sensor system that is able to detect movements of the HMD. The sensor system can include devices such an accelerometer, a gyroscope, a proximity sensor, or similar devices. Of course, other devices and configurations can be used to detect movements of the HMD. Note that the threshold movement typically occurs when a wearer is wearing the HMD. For instance, the HMD can be configured so that a head nod serves as the threshold movement and, therefore, as the secondary gesture. As a further refinement, a head nod in a first direction—for example, an upward head nod—can serve as a first threshold movement and, therefore, as a first type of secondary gesture; a head nod in a second direction—for example, a downward head nod—can serve as a second threshold movement and, therefore, as a second type of secondary gesture. In this example, the first and the second secondary gesture can correspond to different functions of the HMD. For instance, the first secondary gesture (i.e., the upward head nod) can cause the HMD to remove a displayed image from display, whereas the second secondary gesture (i.e., a downward head nod) can cause the HMD to save a displayed image.

Depending on the HMD's configuration, the threshold movement can occur as the wearer is removing the HMD or when the HMD is not worn. As a second illustrative example, a voice command can serve as a secondary gesture. To this end, an HMD can be equipped with a voice-command interface. The voice-command interface can enable the wearer or another person to issue spoken commands to the HMD. These spoken commands are termed "voice commands" for ease of explanation. As a third illustrative example, a gesture at a finger-operable device can trigger a secondary gesture. To this end, an HMD can be equipped with a finger-operable device, such as, for example, the finger-operable touch pad 124 discussed above in connection with FIGS. 1A and 1B. Note that any combination of the actions discussed above can serve as a secondary gesture. In addition, the actions discussed above are illustrative only, so other actions can also serve as secondary gestures.

When an HMD is worn, its configuration can permit inactivity to serve as a secondary gesture. In particular, inactivity by itself can serve as a secondary gesture or the inactivity in combination with one or more actions can serve as the secondary gesture. As an illustrative example, the inactivity can represent a completion of a period in which a wearer of an HMD does not perform a suitable action, such as, for example, one of the actions discussed above. As another illustrative example, a suitable action, such as a head nod, can start a threshold period. Upon determining that the threshold period has ended without suitable activity, the HMD can determine that the secondary gesture has occurred.

Of course, when an HMD is worn, its configuration can permit any combination of eye-related actions, other actions, and inactivity to serve as a secondary gesture.

ii. Secondary Gesture Detection System

An HMD can include a secondary gesture detection system for detecting secondary gestures. The term "secondary gesture detection system," as used in this disclosure, generally refers to any combination of a system, device, or set of instructions that is configured to detect one or more secondary gestures at an HMD. The meaning of the term "secondary gesture detection system" can depend on an HMD's configuration. Several examples are illustrative.

As a first illustrative example, assume that in an HMD, a wink gesture serves as a secondary gesture. In this HMD, a wink detection system, such as the wink detection system discussed above in connection with FIGS. 1A-1B, can also serve as the secondary gesture detection system.

As a second illustrative example, assume that in an HMD, a voice command serves as a secondary gesture. In this HMD, a system for detecting voice commands can serve as the secondary gesture detection system. Note that the system for detecting the voice commands can include software, hardware, or both, depending on the desired implementations of the HMD.

As a third illustrative example, assume that in an HMD, a gesture at a finger-operable device serves as a secondary gesture. In this HMD, the finger-operable device, either by itself or in combination with other hardware or software, can serve as the secondary gesture detection system. For instance, the finger-operable touch pad 124 discussed above in connection with FIGS. 1A-1B can serve as the secondary gesture detection system.

The secondary gesture detection system can also be configured to detect multiple types of secondary gestures. As an illustrative example, assume that in an HMD, a wink gesture and a blink gesture each serve as a secondary gesture. In this HMD, a system that is configured to detect a blink gesture and a wink gesture, such as the system discussed above, can serve as the secondary gesture detection system.

Note that these examples are illustrative only. The secondary gesture detection system can include various systems, devices, or sets of instructions, whether these are currently known or have yet to be developed. In addition, the secondary gesture system can include hardware, software, or a combination of hardware and software.

iii. Image Capture Device

As mentioned above, the method 400, at block 404, can involve causing an image capture device to capture image data, in response to detecting a secondary gesture at an HMD. The image capture device can be a camera, another photographic device, or any combination of hardware, firmware, and software that is configured to capture image data.

The image capture device can be disposed at the HMD or apart from the HMD. As an illustrative example, the image capture device can be a forward-facing camera, such as the video camera 120 that is discussed above in connection with FIGS. 1A and 1B. As another illustrative example, the image capture device can be a camera that is separate from the HMD and in communication with the HMD with the use of a wired or wireless connection. Note that any suitable camera or combination of cameras can serve as the image capture device. Examples of suitable cameras include a digital camera, a video camera, a pinhole camera, a rangefinder camera, a plenoptic camera, a single-lens reflex camera, or combinations of these. These examples are merely illustrative; other types of cameras can be used.

e. Triggering HMD Functionality Based on One or More Gestures

In general, a wink gesture or a combination of gestures that includes a wink gesture can trigger HMD functionality.

i. Examples of HMD Functionality

The term "HMD functionality," as used in this disclosure, generally refers to any function or combination of functions that is performed with the use of an HMD. Examples of HMD functionality include the following: (1) activating, deactivating, or modifying an interface of the HMD; (2) capturing image data using a camera of the HMD, or a camera that is separate from and in communication with the HMD; (3) detecting a face based on an analysis of image data; (4) detecting an object based on analysis of image data; (5) recording a video using a camera of the HMD, or a camera that is separate from and in communication with the HMD; (6) displaying a video using a display of the HMD, or a display that is separate from and in communication with the HMD; (7) sending image data in an e-mail; (8) sending image data to a social network; (9) sending information to another device, such as a mobile phone or another HMD; (10) activating or de-activating the HMD itself; (11) activating or deactivating a display of the HMD, or a display that is separate from and in communication with the HMD; (12) modifying information provided in a display of the HMD, or a display that is separate from and in communication with the HMD; (13) using the HMD to activate or deactivate an external device; and (14) causing a display device to display an image, based on the image data; and (15) any combination of these. These examples are illustrative only; there are numerous other examples of HMD functionality. This disclosure contemplates HMD functionality that is not expressly discussed.

ii. Timing of Combined Gestures

In general, to trigger HMD functionality, the wink gesture and the secondary gesture can occur one after the other or simultaneously. The order of their occurrence can depend on the desired implementation of the HMD. Several HMD implementations serve as illustrative examples. A first HMD implementation can allow a wink gesture followed by a secondary gesture to trigger HMD functionality. As an example, assume that a wearer winks and then nods his head. Also assume that the wink represents the wink gesture and that the head nod represents the secondary gesture. Upon detecting the wink gesture and the secondary gesture in this particular order, the HMD can carry out the HMD functionality.

A second HMD implementation can allow a secondary gesture followed by a wink gesture to trigger HMD functionality. As an example, assume that a wearer says, "take a photo" and then winks twice. Also assume that the voice command "take a photo" represents the secondary gesture and that the two winks represent the wink gesture. Upon detecting the wink gesture and the secondary gesture in this particular order, the HMD can carry out the HMD functionality.

A third HMD implementation can allow a wink gesture and a simultaneously occurring secondary gesture to trigger HMD functionality. As an example, assume that a wearer begins a wink with one eye and that, while holding the wink, the wearer changes the gaze direction of his other eye. Assume that after changing the gaze direction, the wearer releases the wink. Also assume that the wink represents the wink gesture and that the change of gaze direction represents the secondary gesture. Upon detecting that the secondary gesture occurs during the wink, the HMD can carry out the HMD functionality. For example, the HMD can capture image data upon detecting that the change in gaze direction (the secondary gesture) occurs while the wearer is holding the wink (the wink gesture). Note that in this example, the wink gesture and the secondary gesture need not start and end at the same time to trigger the HMD functionality; instead, it suffices that the wink gesture and the secondary gesture temporally overlap. However, some HMD configurations can require that the wink gesture and the secondary gesture start and end at the same time to trigger HMD functionality.

These HMD implementations can be combined in any way. In one combination of these HMD implementations, a secondary gesture followed by a wink gesture can trigger a first HMD functionality, while a wink gesture followed by a secondary gesture can trigger a different, second HMD functionality. As an example, a secondary gesture followed by a wink gesture can trigger a voice-command interface, whereas a wink gesture followed by a secondary gesture can trigger a camera mode. In another combination of these HMD implementations, a secondary gesture followed by a wink gesture can trigger HMD functionality, and the wink gesture followed by the secondary gesture can trigger the same HMD functionality.

iii. Using a Wink Gesture in Combination with a Secondary Gesture to Trigger Multiple HMD Functions A wink gesture and a secondary gesture can occur in combination to trigger multiple functions of an HMD. Some HMD configurations permit a wink gesture to trigger a first HMD function and permit a secondary gesture to trigger a second HMD function. Several illustrative examples follow. As a first illustrative example, assume that a wearer winks and then changes a gaze direction. Also assume that the wink represents the wink gesture and that the change of gaze direction represents the secondary gesture. Upon detecting the wink gesture, the HMD can initiate a camera mode, in which a display of the HMD displays the real-time image stream captured by a lens of the camera. In this way, the display serves as a viewfinder of the camera, and therefore, the real-time image stream is referred to a "viewfinder image" for ease of explanation. Then, upon detecting the secondary gesture, the HMD can activate, deactivate, or modify a photographic function of the HMD. For instance, the HMD can activate a flash function of the camera, upon detecting the secondary gesture.

As a second illustrative example, assume that the order of the wink gesture and the secondary gesture is reversed; that is, the wearer changes the gaze direction (secondary gesture) and then winks (wink gesture). In this example, upon detecting the secondary gesture, the HMD can initiate the camera mode. Then, upon detecting the wink gesture, the HMD can activate, deactivate, or modify the photographic function.

As a third illustrative example, assume that a wearer begins a wink with one eye and that, while holding the wink, the wearer issues the voice command "Turn off flash." Assume that after issuing the voice command, the wearer releases the wink. Also assume that the wink represents the wink gesture and that the voice command represents the secondary gesture. In this example, when the wearer begins the wink, the HMD activates a camera mode (as discussed above). Then, when the wearer issues the voice command, the HMD activates, deactivates, or modifies a photographic function, such as, for example, the flash function of the camera. Then, when the wearer releases the wink, the HMD captures image data. In this way, the wearer can start and hold a wink to enter a camera mode, perform secondary gestures to activate, deactivate, or modify a photographic function (while continuing to hold the wink), and then release the wink to capture image data.

As a fourth illustrative example, assume that a wearer winks and then nods his head. Also assume that the wink represents the wink gesture and that the head nod represents the secondary gesture. In this example, when the wearer winks, the HMD can capture image data, for example, by causing a camera of the HMD to capture an image. In some implementations, a display, such as a display of the HMD, can display an image that corresponds to the image data. The image can be displayed automatically—in other words, without a need for user intervention. Then, when the wearer nods his head, the HMD can perform a predetermined function, such as, for example, causing the display to remove the image from display, storing the image, sending the image to a social network, or sending the image in an e-mail, among other functions. In this way, the HMD can display an image in response to a wink and can then enable a secondary gesture to interact with the displayed image.

In general, in response to detecting a wink gesture, a secondary gesture, or both, an HMD can activate, deactivate, or modify any photographic function. Examples of photographic functions include the following: a zoom function, a flash function, an auto-focus function, a menu in a camera mode, a photo filter, an image size, a burst photography function, a high dynamic range function, and any combination of these. These examples are illustrative only; this disclosure contemplates various other types of photographic functions, regardless whether those functions are now known or later developed.

iv. Using an Additional Gesture in Combination with a Wink Gesture and Secondary Gesture to Trigger Multiple HMD Functions An additional gesture can occur in combination with the wink gesture and secondary gesture to trigger multiple HMD functions. The additional gesture can be another wink gesture or any other suitable gesture. As an illustrative example, assume that a wearer winks, then changes a gaze direction, and then winks again. In this example, the first wink (the wink gesture) triggers a camera mode, the change in gaze direction (the secondary gesture) causes the HMD to change a photographic function, and the second wink (the additional gesture) causes the HMD to capture image data.

The discussion above in relation to wink gestures, secondary gesture, and additional gestures is merely illustrative. In general, this disclosure contemplates any situation in which a wink gesture or a combination of gestures that includes a wink gesture can trigger HMD functionality. When a combination of gestures is involved, the gestures in the combination can be performed in any order to trigger HMD functionality. In addition, the triggered HMD functionality can constitute any function or combination of functions that can be performed in connection with an HMD. The HMD functionality is not limited to those functions discussed above. Nor is the HMD functionality limited to functions that physically occur at the HMD itself. The HMD functionality can include functions that occur elsewhere with the use of the HMD.

f. Triggering HMD Functionality Based on a Context in which an HMD Operates

As discussed above, a wink gesture or a combination that includes a wink gesture can trigger HMD functionality. In some HMD implementations, the triggered HMD functionality need not be the same under all circumstances; rather, the HMD functionality to be triggered can depend on the context in which the HMD operates. Several illustrative examples follow.

As an illustrative example, the HMD functionality to be triggered can depend on the HMD's location. Assume that an HMD detects a wink gesture that is suitable to trigger HMD functionality. Also assume that the HMD is able to utilize data from a sensor system, such as a GPS system, to determine the HMD's location. The HMD can use the determined location to identify a setting in which the HMD is located. Based on the identified setting, the HMD can trigger appropriate HMD functionality. If a wearer of an HMD were to wink at a beach, for example, then the HMD would initiate a camera mode that is optimized to take pictures in an outdoor setting, such as a beach setting. But if the HMD wearer were to wink in a house, for example, then the HMD would responsively initiate a camera mode that is optimized to take pictures in an indoor setting, such as the interior of the house.

As another illustrative example, the HMD functionality to be triggered can depend on the time, by itself or in combination with a determined location. Assume that an HMD detects a wink gesture that is suitable to trigger HMD functionality. Also assume that the HMD is able to determine the local time. Based on the determined time, the HMD can trigger appropriate HMD functionality. If a wearer of an HMD were to wink while standing outside at 9:30 PM, for example, then the HMD would initiate a camera mode with the flash function on, due to the relatively low level of ambient light near the HMD at that time. But if the HMD wearer were to wink while standing outside at 2:30 PM, for example, then the HMD would initiate the camera mode with the flash off, due to the relatively high level of ambient light near the HMD at that time. Note that an HMD need not detect time to determine the level of ambient light near the HMD. Instead, the HMD could use an ambient light sensor to detect the ambient light level near the HMD.

As another illustrative example, the HMD functionality to be triggered can depend on the identity of the HMD's wearer. Assume that the HMD detects a wink gesture that is suitable to trigger HMD functionality. Also assume that the HMD is able to determine the identity of its wearer. Assume further that the HMD has stored preferences for users Alice and Bob. Thus, if Bob were to wear the HMD while winking, for example, then the HMD would capture image data and store the image data to the HMD. But if Alice were to wear the HMD while winking, for example, then the HMD would capture image data and send the image data to a social network.

This disclosure is not limited to these illustrative examples; rather, this disclosure contemplates any other suitable technique for triggering HMD functionality, based on a context in which the HMD operates.

g. Winking to Start or End a Photographic Process

As discussed above, the method 400, at block 402, involves detecting a wink gesture at an HMD. Some implementations of the method 400 can also involve causing a photographic process to commence, in response to detecting the wink gesture at the HMD. Several illustrative examples follow. As an illustrative example, an HMD can commence a time-lapse photography process, in response to detecting the wink gesture at the HMD. For instance, the time-lapse photography process can involve capturing multiple sets of image data at spaced time intervals. As another illustrative example, an HMD can start a process of displaying a video on a display device of the HMD, in response to detecting the wink gesture at the HMD. As another illustrative example, the HMD can start a process or recording a video using a camera of the HMD, in response to detecting the wink gesture at the HMD.

In addition, some implementations of the method 400 can involve causing a photographic process to end, in response to detecting a wink gesture at the HMD. As an illustrative example, assume that a wearer of an HMD winks, with the wink representing a first wink gesture. Upon detecting the first wink gesture, the HMD can begin a time-lapse photography process. Assume that while the time-lapse photography process is active, the wearer winks again, with that wink representing a second wink gesture. Upon detecting the second wink gesture, the HMD can end the time-lapse photography process.

Some implementations of the method 400 can involve detecting a second wink gesture, which can be a wink gesture that occurs before the wink gesture detected at block 402. These implementations can also involve activating the photographic function at the HMD, in response to detecting the second wink gesture at the HMD. As an illustrative example, assume that an HMD wearer winks, with the wink representing a first wink gesture. Upon detecting the first wink gesture, the HMD can begin recording a video using a camera of the HMD. Assume that while the HMD is recording the video, the HMD wearer winks again, with that wink representing a second wink gesture. Upon detecting the second wink gesture, the HMD can capture the present frame of the video as image data. Of course, the HMD can also capture multiple frames of the video as image data.

As discussed above, the method 400, at block 404, involves causing an image capture device to capture image data, in response to detecting a wink gesture at the HMD. In some implementations that involve causing a photographic process to commence, block 404 of the method 400 can involve capturing image data that results from the photographic process. Several illustrative examples follow. As a first illustrative example, assume that the photographic process is a time-lapse photography process. In this example, block 404 can involve capturing one set of image data or multiple sets of image data that result from the time-lapse photography process. As a second illustrative example, assume that the photographic process involves displaying a video on a display device. In this example, block 404 can involve capturing one or more frames of the video. As a third illustrative example, assume that the photographic process involves recording a video using a camera. In this example, block 404 can similarly involve capturing one or more frames of the video.

h. Using Image Data as Input to a Function of an HMD

As discussed above, the method 400, at block 404, involves causing an image capture device to capture image data, in response to detecting the wink gesture at the HMD. Some implementations of the method 400 can involve using the captured image data as input to a function of the HMD.

The image data can be used as input to any function of the HMD. Examples of HMD functions include the following: (1) activating, deactivating, or modifying an interface, such as a voice command interface of the HMD; (2) displaying an image corresponding to the image data at a display, such as a display of the HMD or a separate display; (3) detecting a face based on the image data; (4) detecting an object based on the image data; (5) recording a video using a camera of the HMD;

(6) displaying a video using a display of the HMD; (7) sending the image data in an e-mail; (8) sending the image data to a social network; (9) sending information to another device, such as a mobile phone or another HMD; (10) activating or de-activating the HMD itself; (11) activating or deactivating a display of an HMD; (12) modifying information provided in a display of an HMD; (13) using the HMD to activate, deactivate, or modify an external device, such as an external camera or display; and (14) any combination of these. These examples are merely illustrative; there are numerous other types of HMD functions. This disclosure contemplates HMD functions that are not expressly discussed.

The following examples serve to illustrate how image data can be used as input to a function of an HMD. For the purpose of several illustrative examples, assume that the HMD is able to cause a camera to capture image data. The camera can be part of the HMD or can be a separate camera that the HMD is able to control in a wired or wireless fashion. Also assume that the HMD is able to detect a person's face based on an analysis of the image data, such as, for example, by using a suitable facial-detection algorithm. Upon detecting the face, the HMD can attempt to identify the person, based on the face. To this end, the HMD can analyze the face with reference to information stored at the HMD or to information stored remotely. Upon identifying the person, the HMD can send the image data to an account that is associated with the person. For example, the HMD can send the image data as an e-mail attachment to the person's e-mail address. As another example, the HMD can send the image data to the person's phone number using a multimedia messaging service. As yet another example, the HMD can post the image data to the person's social-network account or, in other words, send the image data to the social network in a way that the image data becomes associated with the person's social-network account.

4. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method comprising:
    detecting a wink gesture at a head-mountable device (HMD), wherein detecting a wink gesture comprises:
        determining a light intensity level at the HMD based on light reflected from an eye area, wherein the eye area includes skin to a side of an eye; and
        determining that the light intensity level corresponds, at least in part, to light reflected from wrinkles in the skin to the side of the eye that are characteristic of a wink; and
    causing an image capture device to capture image data, in response to detecting the wink gesture at the HMD.

2. The method of claim 1, further comprising:
    causing a display device to display an image that corresponds to the image data; and
    enabling a secondary gesture to interact with the image.

3. The method of claim 2, wherein the secondary gesture comprises a head nod.

4. The method of claim 2, wherein the enabling the secondary gesture to interact with the image comprises causing the display device to remove the image from display.

5. The method of claim 2, wherein the causing the display device to display the image is performed without a need for user intervention.

6. The method of claim 1, further comprising detecting a secondary gesture at the HMD, wherein the causing the image capture device to capture the image data is performed further in response to the detecting the secondary gesture at the HMD.

7. The method of claim 6, wherein the detecting the secondary gesture at the HMD is performed after the detecting the wink gesture at the HMD.

8. The method of claim 6, wherein the detecting the secondary gesture at the HMD is performed before the detecting the wink gesture at the HMD.

9. The method of claim 6, wherein:
    the detecting the secondary gesture at the HMD is performed while the wink gesture is occurring; and
    the causing the image capture device to capture the image data is performed after the wink gesture ends.

10. The method of claim 6, further comprising activating a photographic function at the HMD, in response to the detecting the secondary gesture at the HMD.

11. The method of claim 10, wherein the photographic function at the HMD is selected from the group consisting of: a zoom function, a flash function, a focus function, and any combination thereof.

12. The method of claim 6, wherein:
    the wink gesture comprises a wink of an eye of a wearer of the HMD when the HMD is worn; and
    the secondary gesture comprises a wink of the other eye of the wearer when the HMD is worn.

13. The method of claim 6, wherein the secondary gesture and the wink gesture occur simultaneously.

14. The method of claim 6, wherein the secondary gesture is selected from the group consisting of: a squint gesture, a blink gesture, a movement of the HMD, an eye movement, a voice command, a head nod, a gesture at a finger-operable device disposed at the HMD, an inaction during a threshold period, and any combination thereof.

15. The method of claim 1, further comprising causing a display device to display a video, wherein the causing the image capture device to capture the image data comprises capturing at least a part of the video.

16. The method of claim 1, further comprising commencing a photographic process, in response to the detecting the wink gesture at the HMD.

17. The method of claim 16, wherein the photographic process is selected from the group consisting of: a time-lapse photographic process, a process of recording a video, a process of displaying a video, and any combination thereof.

18. The method of claim 16, wherein the image data is captured based on data that results from the photographic process.

19. The method of claim 16, further comprising:
    detecting a second wink gesture at the HMD, after the commencing the photographic process; and
    ending the photographic process, in response to the detecting the second wink gesture at the HMD.

20. The method of claim 1, further comprising activating a photographic function at the HMD, in response to the detecting the wink gesture at the HMD, wherein the causing the image capture device to capture the image data is performed after the activating the photographic function at the HMD.

21. The method of claim 20, wherein the photographic function at the HMD is selected from the group consisting of:

a zoom function, a flash function, an auto-focus function, a burst photography function, a high dynamic range function, and any combination thereof.

22. The method of claim 1, further comprising:
    detecting a second wink gesture at the HMD, before the detecting the wink gesture at the HMD; and
    activating a photographic function at the HMD, in response to the detecting the second wink gesture at the HMD.

23. The method of claim 1, further comprising using the image data as an input to a function of the HMD.

24. The method of claim 23, wherein the function of the HMD is selected from the group consisting of: performing an analysis of the image data, sending the image data to a social network, sending the image data in a message, and any combination thereof.

25. The method of claim 23, wherein the using the image data as the input to the function of the HMD is performed without displaying an image corresponding to the image data.

26. The method of claim 1, further comprising:
    detecting a face of a person, based on an analysis of the image data;
    identifying the face; and
    sending the image data to an account that is associated with the person.

27. A non-transitory computer-readable medium having stored therein instructions that, upon execution by a computing device, cause the computing device to perform functions comprising:
    detecting a wink gesture at a head-mountable device (HMD), wherein detecting a wink gesture comprises:
        determining a light intensity level at the HMD based on light reflected from an eye area, wherein the eye area includes skin to a side of an eye; and
        determining that the light intensity level corresponds, at least in part, to light reflected from wrinkles in the skin to the side of the eye that are characteristic of a wink; and
    causing an image capture device to capture image data, in response to detecting the wink gesture at the HMD.

28. The non-transitory computer-readable medium of claim 27, wherein the functions further comprise detecting a secondary gesture at the HMD, wherein the causing the image capture device to capture the image data is performed further in response to detecting the secondary gesture at the HMD.

29. The non-transitory computer-readable medium of claim 27, wherein the functions further comprise commencing a photographic process, in response to the detecting the wink gesture at the HMD.

30. The non-transitory computer-readable medium of claim 27, wherein the functions further comprise using the image data as an input to a function of the HMD without displaying an image corresponding to the image data.

31. A system of a head-mountable device (HMD), the system comprising:
    an image capture device that is connected to the HMD, wherein when the HMD is worn, the image capture device is configured to capture image data;
    a wink-detection system that is connected to the HMD, wherein when the HMD is worn, the wink-detection system is configured to detect a wink gesture at the HMD, wherein the wink-detection system comprises:
        a proximity sensor that detects a movement of the eye area, wherein the proximity sensor comprises:
            a receiver portion disposed at a side section of the HMD, wherein the receiver portion receives light reflected from an eye area, wherein the eye area includes a skin to a side of an eye, wherein the proximity sensor detects the movement of the eye area based at least in part on the light received by the receiver portion; and
    a computer-readable medium having stored therein program instructions that, upon execution by a computing device, cause the computing device to perform functions comprising:
        causing the image capture device to capture the image data, in response to the wink-detection system detecting the wink gesture at the HMD, wherein detecting the wink gesture at the HMD comprises:
            determining a light intensity level at the receiver portion;
            determining that the light intensity level corresponds, at least in part, to light reflected from wrinkles in the skin to the side of the eye that are characteristic of a wink.

32. The system of claim 31, further comprising a secondary gesture detection system that is connected to the HMD, wherein when the HMD is worn, the secondary gesture detection system is configured to detect a secondary gesture at the HMD, wherein causing the image capture device to capture the image data is performed further in response to the secondary gesture detection system detecting the secondary gesture at the HMD.

33. The system of claim 32, wherein the secondary gesture at the HMD is selected from the group consisting of: a squint gesture, a blink gesture, a movement of the HMD, a head nod, an eye movement, a voice command, a gesture at a finger-operable device disposed at the HMD, an inaction during a threshold period, and any combination thereof.

* * * * *